(12) United States Patent
Lodhie

(10) Patent No.: US 6,598,996 B1
(45) Date of Patent: Jul. 29, 2003

(54) LED LIGHT BULB

(76) Inventor: Pervaiz Lodhie, Ledtronics, Inc., 23105 Kashiwa Ct., Torrance, CA (US) 90505

( * ) Notice: Subject to any disclaimer, the term of this patent is extended or adjusted under 35 U.S.C. 154(b) by 0 days.

(21) Appl. No.: 10/134,825

(22) Filed: Apr. 29, 2002

Related U.S. Application Data

(60) Provisional application No. 60/286,955, filed on Apr. 27, 2001.

(51) Int. Cl.[7] ............................................. F21V 21/00
(52) U.S. Cl. ...................... 362/249; 362/235; 362/545; 362/252; 362/800
(58) Field of Search ................................ 362/235, 545, 362/249, 252, 800

(56) References Cited

U.S. PATENT DOCUMENTS

| | | | |
|---|---|---|---|
| 4,211,955 A | | 7/1980 | Ray |
| 5,160,200 A | | 11/1992 | Cheselske |
| 5,160,201 A | | 11/1992 | Wrobel |
| 5,567,036 A | * | 10/1996 | Theobald et al. ........... 362/236 |
| D385,051 S | | 10/1997 | Wu |
| 5,806,965 A | * | 9/1998 | Deese ........................ 362/249 |
| D404,506 S | | 1/1999 | Lodhie |
| D405,201 S | | 2/1999 | Lodhie |
| 5,921,660 A | | 7/1999 | Yu |
| 5,929,788 A | * | 7/1999 | Vukosic ................... 340/908.1 |
| 5,947,588 A | | 9/1999 | Huang |
| D434,510 S | | 11/2000 | Lodhie |
| 6,220,722 B1 | | 4/2001 | Begemann |
| 6,234,648 B1 | | 5/2001 | Borner et al. |
| 6,371,636 B1 | | 4/2002 | Wesson |

* cited by examiner

Primary Examiner—Thomas M. Sember
(74) Attorney, Agent, or Firm—Eric Karich

(57) ABSTRACT

A light emitting diode lamp for use in a brake light bulb socket of an automobile or similar vehicle has first and second printed circuit boards having first and second pluralities of light emitting diodes mounted thereupon for emitting monochromatic light in response to power signals supplied from the automobile. The light emitting diode lamp further includes a body adapted to form a bayonet connection, a base having at least one contact, and a support sleeve having a wiring conduit, a support tray, and at least two support stanchions for supporting the first printed circuit board. Finally, the light emitting diode lamp includes at least one resistor electrically connected between the at least one contact and a first wire that is electrically connected to the first and second printed circuit boards.

3 Claims, 4 Drawing Sheets

LED LIGHT BULB

CROSS-REFERENCE TO RELATED APPLICATIONS

This application for a utility patent claims the benefit of U.S. Provisional Application No. 60/286,955, filed Apr. 27, 2001, incorporated herein by reference in its entirety.

STATEMENT REGARDING FEDERALLY SPONSORED RESEARCH

Not Applicable

BACKGROUND OF THE INVENTION

1. Field of the Invention

This invention relates generally to brake lights, and more particularly to a dual function brake and turn signal light emitting diode lamp.

2. Description of Related Art

The light emitting diode lamp of the present invention is particularly useful for replacing incandescent lamps used in automobiles and other motor vehicles and are applicable to the manufacture of replacement LED lamps for both single filament and dual filament incandescent bulbs. LED's typically operate at voltages between 1.7 and 2.2 volts.

A typical prior art incandescent lamp generally employs a type S-8 glass bulb cemented in a brass bayonet base having dual contacts. A similar incandescent lamp is described in Devir et al., U.S. Pat. No. 4,603,278. Incandescent vehicle signal-lamp lamps consume a relatively large amount of power, generate a large amount of heat and have a relatively short life.

LED lamps designed to replace vehicle incandescent lamps require bases similar to the standard bayonet base. To be effective an LED lamp must be adapted to produce an intense light when viewed by the human eye and must provide for effective heat dissipation to avoid impairing the LED's. It also must be designed to operate within the range of voltages present in motor vehicles so as to not overvoltage the LED's. Finally, some models of motor vehicles ground the brake circuit when the brake is not activated to prevent any accidental activation of the brake lights; accordingly, an effective LED lamp designed to replace a dual filament lamp must contain circuitry enabling the LED's to be activated with either the tail lamp circuit or the brake light circuit.

Roney et al., U.S. Pat. No. 5,632,551, teaches one approach to solving the problems of cooling the LED's. Roney teaches an LED lamp as used in truck trailers and/or tractors. The LED's are mounted on a printed circuit board (PCB). The LED's are embedded in resin to facilitate the conduction of heat away from the LED's so that the heat will not cause the LED's to degrade and lose brightness. This lamp is not designed to fit in standard automotive lamp sockets. A second approach to the cooling problem is given by U.S. Pat. No. 5,575,459 (Anderson) which describes an AC LED lamp that uses air holes to provide air circulation and cooling for an LED lamp. This lamp is not suitable for motor vehicle use. U.S. Pat. No. 6,045,240 (Hochstein) presents a third solution to the problem of cooling the LED's by teaching the use of a heat sink to cool an LED array.

Cheselske, U.S. Pat. No. 5,160,200, teaches a similar type of LED lamp having a wedge base. It provides a parallel string of LED's soldered and rolled up for 2-volt dc operation. The roll is placed in a housing with two leads extending out the wedge type base. No provisions are made for 12-volt operation, dual element operation, voltage control, heat dissipation, or brightness enhancement.

Huang, U.S. Pat. No. 5,947,588, describes an LED lamp where an LED array is mounted on a printed circuit board which is in turn mounted on a standard automotive bayonet type base. The LED's are directly connected to the electrical contacts on the bayonet base. The patent shows an embodiment of the lamp to replace a dual filament lamp. The patent does not describe the circuit connections of the LED's to the contacts, but either the LED's are grouped into two sets—one for use as tail lights and a second for use as brake lights—or the LED's are connected in parallel so that all LED's are illuminated when either the tail light or the brake light circuit is energized. If the LED's are grouped in the two sets then all of the LED's cannot be energized at once resulting in dimmer tail light and brake lights. On the other hand, if the circuits are connected in parallel so that all LED's would be energized if either tail lamp or brake lamp circuit were energized, the array would not work as tail lamps in automobiles in which the brake lamp is grounded when the brake is not activated. Also, if this configuration did work in some vehicles, the tail lamps and the brake lamps would be illuminated with equal intensity, that is the brake lights would not be brighter. The patent discusses the problem of low intensity by suggesting the addition of more LED's; this would make the array larger than a standard incandescent lamp which in turn would result in the LED lamp being unable to fit into many tail lamp assemblies. Also, this configuration of LED lamp will not fit into many recessed automotive sockets and lamp assemblies.

Wesson, U.S. Pat. No. 6,371,636 B1, teaches a light emitting diode lamp for use in vehicle tail, brake or turn signal lamp fixtures for integrated single and dual element operation. The module has integrated dual element control circuitry, voltage and current control circuitry, brightness enhancement circuitry, and LED circuitry built into the universal body to produce a bright, reliable, long life, energy efficient LED lamp that fits all vehicles.

The above-described references are hereby incorporated by reference in full.

The prior art teaches a light emitting diode lamp for use in a vehicle such as an automobile. However, the prior art does not teach a support sleeve for supporting first and second printed circuit boards in the present arrangement. The present invention fulfills these needs and provides further related advantages as described in the following summary.

SUMMARY OF THE INVENTION

The present invention teaches certain benefits in construction and use which give rise to the objectives described below.

The present invention provides a light emitting diode lamp for use in a brake light bulb socket of an automobile or similar vehicle. In the preferred embodiment, the light emitting diode lamp can be used as both a brake signal and a turn signal. The light emitting diode lamp includes first and second printed circuit boards having first and second pluralities of light emitting diodes mounted thereupon for emitting monochromatic light in response to power signals supplied from the automobile. The light emitting diode lamp further includes a body adapted to form a bayonet connection, a base having at least one contact, and a support sleeve having a wiring conduit, a support tray, and at least two support stanchions for supporting the first printed circuit board. Finally, the light emitting diode lamp includes an electrical control means electrically connecting the first and second contacts with the first and second printed circuit boards, and a lens cap having a planar front face integrally formed with a cylindrical lens sidewall that terminates in a lens perimeter.

A primary objective of the present invention is to provide a light emitting diode lamp having advantages not taught by the prior art.

Another objective is to provide a light emitting diode lamp that is impact resistant and provides a maximum output of monochromatic light with minimal heat buildup.

A further objective is to provide a light emitting diode lamp having a support sleeve that supports first and second printed circuit boards in an operable relationship for maximum output of monochromatic light while maintaining the high impact resistance.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
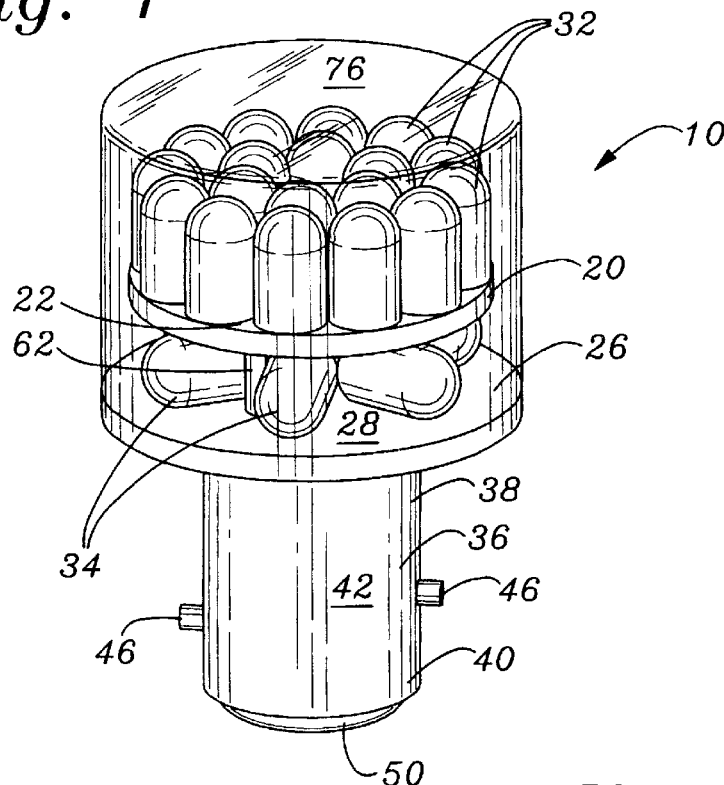
FIG. 1 is a perspective view of the preferred embodiment of the present invention.
Figure 2:
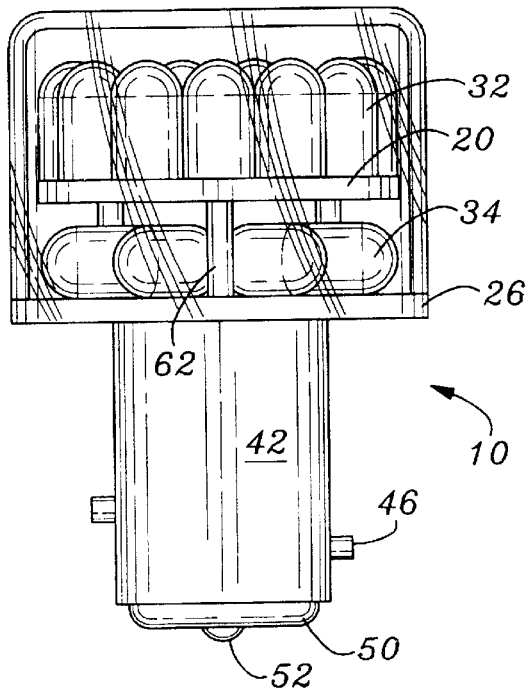
FIG. 2 is a front elevational view thereof.
Figure 3:
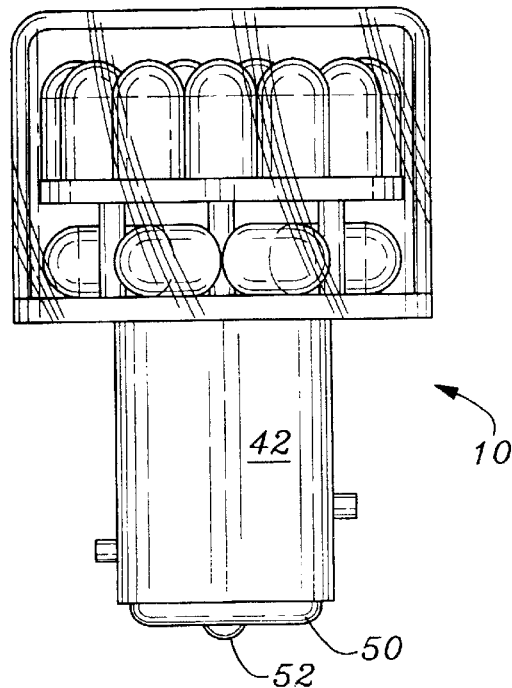
FIG. 3 is a rear elevational view thereof.
Figure 4:
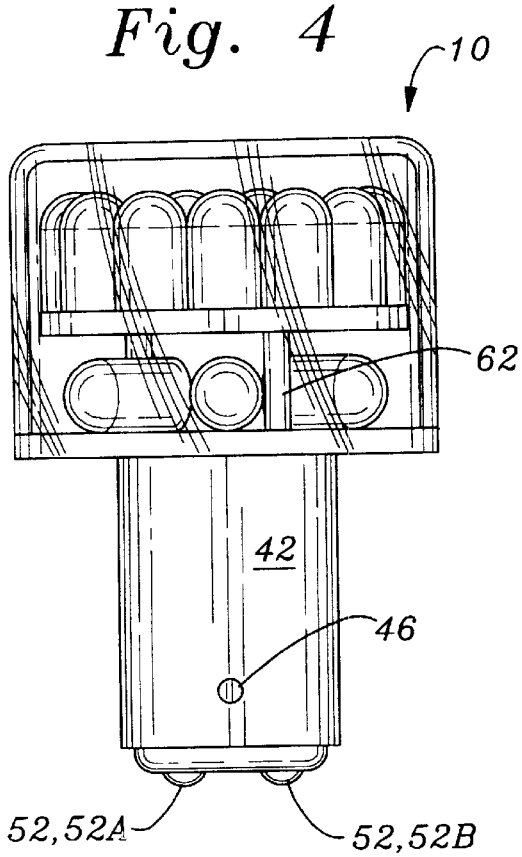
FIG. 4 is a left side elevational view thereof.
Figure 5:
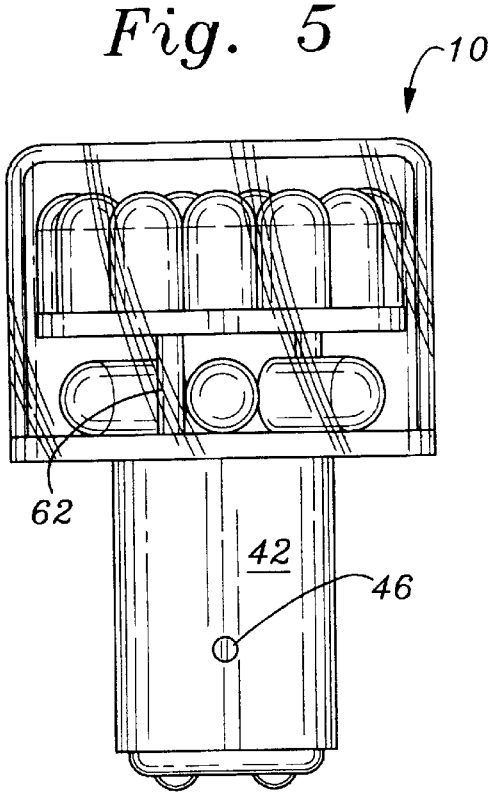
FIG. 5 is a right side elevational view thereof.
Figure 6:
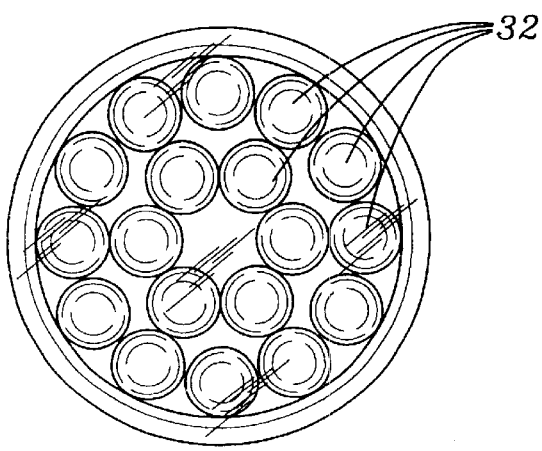
FIG. 6 is a top plan view thereof.

The above-described drawing figures illustrate the invention, a light emitting diode lamp 10 for use in a brake light bulb socket (not shown) of an automobile or similar vehicle. In the preferred embodiment, the light emitting diode lamp 10 can be used as both a brake signal and a turn signal As shown in FIGS. 1–6 and 8, the light emitting diode lamp 10 of the present invention includes first and second printed circuit boards 20 and 26 having first and second pluralities of light emitting diodes 32 and 34 mounted thereupon for emitting monochromatic light in response to power signals supplied from the automobile. The first printed circuit board 20 has a first top surface 22 and a first bottom surface 24. The second printed circuit board 26 has a second top surface 28 and a second bottom surface 30. The first plurality of light emitting diodes 32 is mounted on and generally normal to the first top surface 22 and electrically coupled with the first printed circuit board 20. The second plurality of light emitting diodes 34 is mounted on and generally parallel to the second top surface 28 and electrically coupled with the second printed circuit board 26.

As shown in FIGS. 1–8, the light emitting diode lamp 10 includes a body 36 having a first end 38, a second end 40, and a body sidewall 42 defining a cavity 44 within the body 36. The body sidewall 42 has two alignment pins 46 extending therefrom to form a bayonet connection that is typically used for forming an operable connection with a brake light bulb socket. The body 36 is preferably constructed of an electrically conductive material such as brass for providing a ground, as described below.

Figure 7:
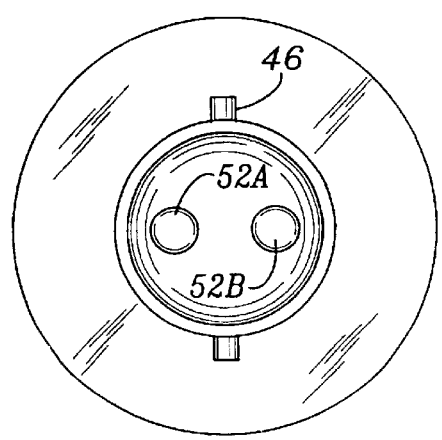
FIG. 7 is a bottom plan view thereof.
Figure 8:
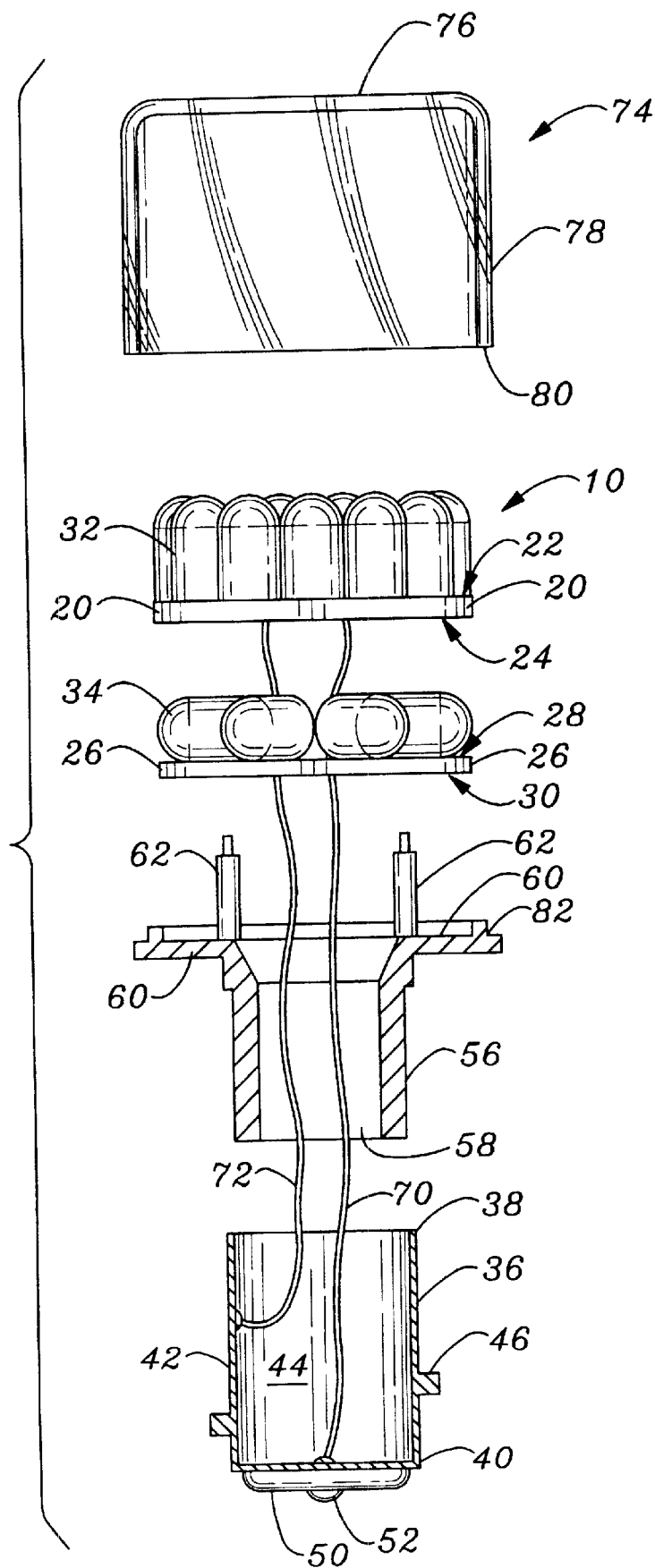
FIG. 8 is an exploded perspective view thereof.
Figure 9:
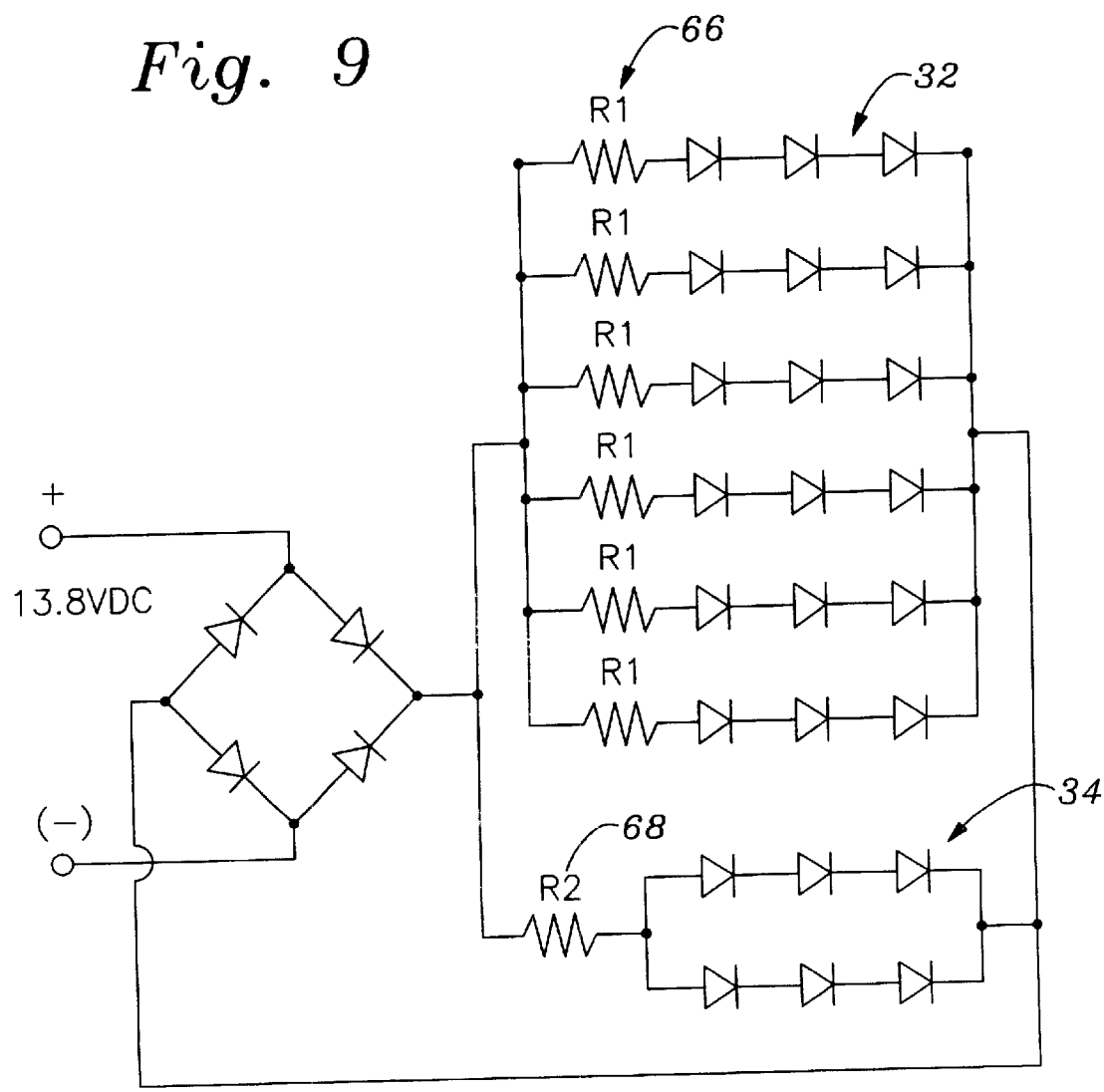
FIG. 9 is a schematic diagram thereof.

As shown in FIGS. 7–8, the light emitting diode lamp 10 includes a base 50 having at least one contact 52. The base 50 is operably attached to the second end 40 of the body 36. The at least one contact 52 is electrically isolated, except for the ground as described below, for providing power to the light emitting diode lamp 10. In the preferred embodiment, the at least one contact 52 includes a first contact 52A and a second contact 52B.

As shown in FIG. 7, the light emitting diode lamp 10 includes a support sleeve 56 that is critical to the present invention. The support sleeve 56 has a wiring conduit 58, a support tray 60, and at least two support stanchions 62. The support tray 60 is shaped like a planar tray to support the second printed circuit board 26 thereupon. The at least two support stanchions 62 extending upwardly from the support tray 60 to support the first printed circuit board 20 above and generally parallel to the first printed circuit board 20. The at least two support stanchions 62 preferably include three support stanchions; however, the number can vary as long as the first printed circuit board is firmly supported. The support sleeve 56 is constructed of a tough, impact and heat resistant material such as plastic. The support sleeve 56 is preferably constructed of an injection molded polycarbonate such as LEXAN®. LEXAN® is a registered trademark of the General Electric Company.

As shown in FIG. 8, the light emitting diode lamp 10 includes an electrical control means electrically connecting the first and second contacts 52A and 52B with the first and second printed circuit boards 20 and 26. The electrical control means preferably includes at least one resistor, preferably a plurality of first resistors 66 and a second resistor 68. The plurality of first resistors 66 are positioned on the first printed circuit board 20 and electrically connected between the first wire 70 and the plurality of first light emitting diodes. The second resistor 68 is positioned on the second printed circuit board 26 and electrically connected between the first wire 70 and the second plurality of light emitting diodes 34. The electrical control means further includes a second wire 72 that electrically connects the first and second printed circuit boards 20 and 26 to the body 36 for providing a ground.

Finally, as shown in FIG. 8, the light emitting diode lamp 10 includes a lens cap 74 having a planar front face 76 integrally formed with a cylindrical lens sidewall 78 that terminates in a lens perimeter 80. The support tray 60 preferably has a tray perimeter 82 adapted to engage the lens perimeter 80 for providing a secure connection between the two elements.

While the invention has been described with reference to at least one preferred embodiment, it is to be clearly understood by those skilled in the art that the invention is not limited thereto. Rather, the scope of the invention is to be interpreted only in conjunction with the appended claims.

All patents, patent applications, and other documents and printed matter cited or referred to in this application is hereby incorporated by reference in full.

What is claimed is:

1. A light emitting diode lamp comprising:

a first printed circuit board having a first top surface and a first bottom surface;

a second printed circuit board having a second top surface and a second bottom surface;

a first plurality of light emitting diodes mounted on and generally normal to the first top surface and electrically coupled with the first printed circuit board;

a second plurality of light emitting diodes mounted on and generally parallel to the second top surface and electrically coupled with the second printed circuit board;

a body having a first end, a second end, and a body sidewall defining a cavity within the body, the body sidewall having two alignment pins extending therefrom;

a base having at least one contact, the base being attached to the second end of the body;

a support sleeve having a wiring conduit, a support tray, and at least two support stanchions, the support tray being shaped to support the second printed circuit board, and the at least two support stanchions extending upwardly from the support tray to support the first printed circuit board above and generally parallel to the first printed circuit board; and an electrical control means electrically connecting the at least one contact with the first and second printed circuit boards.

2. The light emitting diode lamp of claim 1 further comprising a lens cap having a planar front face integrally formed with a cylindrical lens sidewall that terminates in a lens perimeter, and wherein the support tray has an tray perimeter adapted to engage the lens perimeter.

3. The light emitting diode lamp of claim 1 wherein the support sleeve is constructed of polycarbonate.

* * * * *